(12) United States Patent  (10) Patent No.: US 9,317,805 B1
Fraenkel  (45) Date of Patent: Apr. 19, 2016

(54) SYSTEM AND METHOD OF PERFORMING MODULAR QUANTITATIVE ANALYSIS WITH NODES THAT HAVE CONTEXTUAL LABELS

(71) Applicant: UBS AG, Zurich (CH)

(72) Inventor: Peter N. Fraenkel, New York, NY (US)

(73) Assignee: UBS AG, Zurich (CH)

( * ) Notice: Subject to any disclaimer, the term of this patent is extended or adjusted under 35 U.S.C. 154(b) by 190 days.

(21) Appl. No.: 13/797,646

(22) Filed: Mar. 12, 2013

(51) Int. Cl.
   *G06N 5/02* (2006.01)

(52) U.S. Cl.
   CPC ........................................ *G06N 5/02* (2013.01)

(58) Field of Classification Search
   None
   See application file for complete search history.

(56) References Cited

U.S. PATENT DOCUMENTS

| | | | | |
|---|---|---|---|---|
| 5,809,212 | A * | 9/1998 | Shasha | 706/46 |
| 7,698,343 | B2 | 4/2010 | Anderson et al. | |
| 8,631,068 | B1 | 1/2014 | Jannink et al. | |
| 2003/0229605 | A1 * | 12/2003 | Herrera et al. | 706/47 |
| 2005/0289168 | A1 * | 12/2005 | Green et al. | 707/101 |
| 2006/0161814 | A1 * | 7/2006 | Wocke et al. | 714/26 |
| 2007/0266144 | A1 | 11/2007 | Bollen et al. | |
| 2008/0059563 | A1 | 3/2008 | Bachmann et al. | |
| 2008/0281801 | A1 | 11/2008 | Larson et al. | |
| 2011/0320496 | A1 | 12/2011 | Reid et al. | |
| 2012/0109842 | A1 | 5/2012 | Bhatt et al. | |
| 2012/0130932 | A1 * | 5/2012 | Veanes et al. | 706/46 |
| 2012/0197900 | A1 | 8/2012 | Mandre | |
| 2012/0304172 | A1 | 11/2012 | Greifeneder et al. | |
| 2013/0066823 | A1 * | 3/2013 | Sweeney et al. | 706/50 |

OTHER PUBLICATIONS

Artificial Intelligence, 27, 1985, pp. 97-109 "Depth-First Iterative-Deepening: An Optimal Admission Tree Search".*
Google search.*
Final Office Action issued for U.S. Appl. No. 13/797,472 dated Oct. 6, 2015.
Luke et al., "Evolving Graphs and Networks with Edge Encoding: Preliminary Report," 1996, Papers of the Genetic Programming, Jul. 1996, pp. 1-8.

* cited by examiner

*Primary Examiner* — Kakali Chaki
*Assistant Examiner* — Isidore Sobkowski
(74) *Attorney, Agent, or Firm* — Pillsbury Winthrop Shaw Pittman LLP

(57) ABSTRACT

Quantitative analysis is provided through the implementation of a graph that includes nodes having edges therebetween representing data dependencies between the nodes. The nodes include calculation objects such as programs, data, libraries, and/or other objects. The nodes provide for modular computation that provides for transparency, record-keeping, experimentation, and/or other functionalities.

26 Claims, 7 Drawing Sheets

SYSTEM AND METHOD OF PERFORMING MODULAR QUANTITATIVE ANALYSIS WITH NODES THAT HAVE CONTEXTUAL LABELS

RELATED APPLICATIONS

This application is related to, and incorporates herein by reference in its entirety, U.S. patent application Ser. No. 13/797,472, filed Mar. 12, 2013, and entitled "System And Method Of Performing Modular Quantitative Analysis With Nodes That Have Temporality."

FIELD

The disclosure relates to an analytical system and method that implements a graph comprising script nodes and data nodes to provide for efficient modular computation.

BACKGROUND

Within the finance industry, the risk management of positions in derivatives securities provides a technological challenge. Conventional solutions have focused on providing powerful enough analytical tools to derive the value of securities from the prices of the instruments on which they depend. These solutions have provided mathematical models for behavior of these prices. Such calculations tend to involve computational intensive Monte Carlo techniques, and valuing an individual derivative security may take anywhere from seconds to hours.

SUMMARY

One aspect of the disclosure relates to a system configured to perform quantitative analysis. The system may comprise one or both of non-transitory storage media and/or one or more processors.

The non-transitory storage media stores a graph comprising nodes used in the performance of calculations, the nodes including a first node, a second node, and a third node, the nodes being identified by keys that include node identifiers and contextual label collections such that the first node is identified by a first key that includes a first node identifier and a first contextual label collection, the second node is identified by a second key that includes a second node identifier and a second contextual label collection, and the third node is identified by a third key that includes a third node identifier and a third contextual label collection. The storage media further stores dependencies between nodes that indicate specific nodes used in the creation of other nodes such that, responsive to the first node being used in the creation of the second node, the first node is a dependency of the second node, the dependency of the second node on the first node being stored to the storage media. Information stored to the storage media reflects transitive dependencies between nodes such that, responsive to the third node being used in the creation of the first node, the third node is a transitive dependency of the second node, the transitive dependency of the second node on the third node being reflected in the information stored to the storage media. The edges in the graph represent dependencies between the nodes such that an edge between the first node and the second node represents that the first node is a dependency of the second node.

The one or more processors are configured to execute computer program modules. The computer program modules may include one or more of a node search module configured to identify nodes that satisfy queries to the graph based on the node identifiers and contextual label collections included in the keys of the nodes such that identification of a node that satisfies a first query to the graph that includes a specified node identifier and a specified contextual label collection is made by: (a) searching for one or more nodes having keys that include a node identifier that matches the specified node identifier and a contextual label collection that matches the specified contextual label collection; (b) responsive to no nodes having keys meeting the criteria of (a), modifying the specified contextual label collection in accordance with a routine to generate a modified contextual label collection; (c) searching for one or more nodes having keys that include a node identifier that matches the specified node identifier and a contextual label collection that matches the modified contextual label collection; and (d) responsive to no nodes having keys meeting the criteria of (c), iterating over (b) and (c) to generate and search on a further modified contextual label collection.

Another aspect of the disclosure relates to a computer-implemented method of performing quantitative analysis, method being implemented in a computer system that includes one or more physical processors and non-transitory storage media. The method comprising: storing, to the storage media, a graph comprising nodes used in the performance of calculations, the nodes including a first node, a second node, and a third node, the nodes being identified by keys that include node identifiers and contextual label collections such that the first node is identified by a first key that includes a first node identifier and a first contextual label collection, the second node is identified by a second key that includes a second node identifier and a second contextual label collection, and the third node is identified by a third key that includes a third node identifier and a third contextual label collection, storing, to the storage media, dependencies between nodes that indicate specific nodes used in the creation of other nodes such that, responsive to the first node being used in the creation of the second node, the first node is a dependency of the second node, the dependency of the second node on the first node being stored to the storage media, wherein information stored to the storage media reflects transitive dependencies between nodes such that, responsive to the third node being used in the creation of the first node, the third node is a transitive dependency of the second node, the transitive dependency of the second node on the third node being reflected in the information stored to the storage media, wherein edges in the graph represent dependencies between the nodes such that an edge between the first node and the second node represents that the first node is a dependency of the second node; and receiving a first query to the graph, the first query including a specified node identifier and a specified contextual label collection; identifying a node that satisfies the first query, wherein such identification of a node that satisfies the first query to the graph includes: (a) searching for one or more nodes having keys that include a node identifier that matches the specified node identifier and a contextual label collection that matches the specified contextual label collection; (b) responsive to no nodes having keys meeting the criteria of (a), modifying the specified contextual label collection in accordance with a routine to generate a modified contextual label collection; (c) searching for one or more nodes having keys that include a node identifier that matches the specified node identifier and a contextual label collection that matches the modified contextual label collection; and (d) responsive to no nodes having keys meeting the criteria of (c), iterating over (b) and (c) to generate and search on a further modified contextual label collection.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
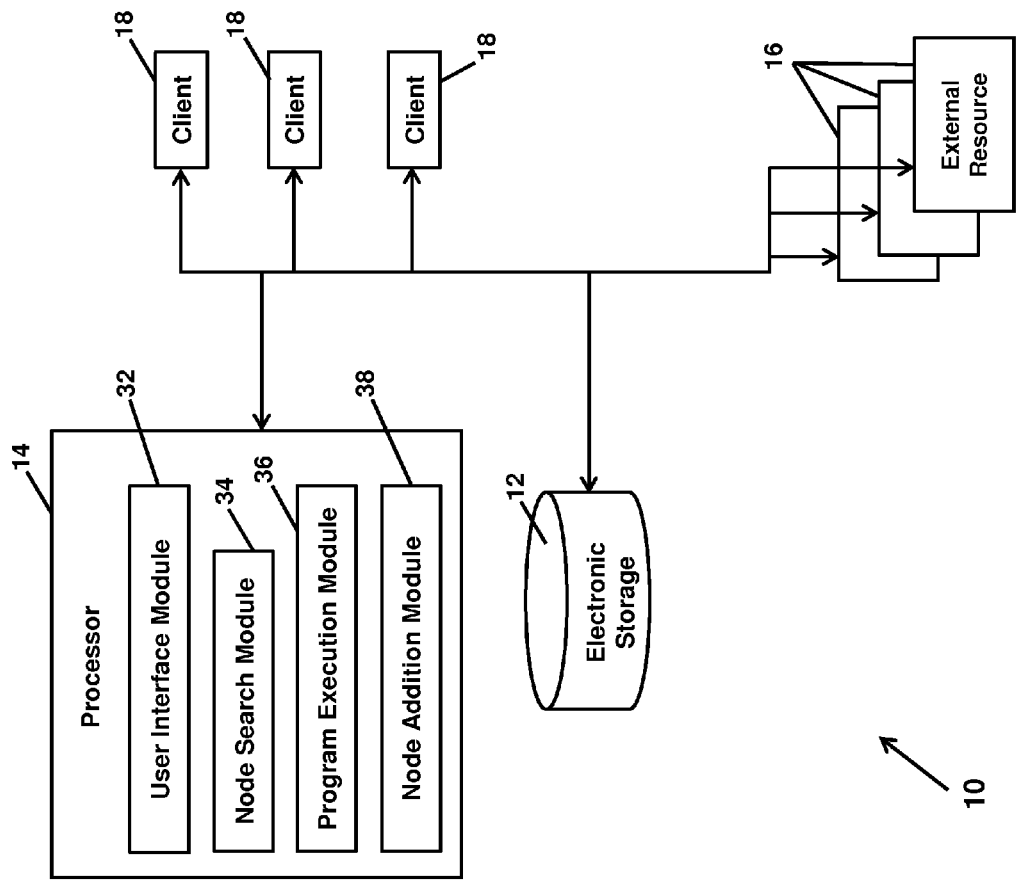
FIG. 1 illustrates a system configured to perform quantitative analysis.

FIG. 1 illustrates a system 10 configured to perform analysis. System 10 may be configured to manage analytic resources in a manner that may provide one or more enhancements over conventional analytic systems. Such enhancements may include one or more of performing memoization, reducing redundancy, providing for efficient deployment of processing, storage, and/or communication resources, preserving a computational record to facilitate recreation of previously performed analytics, and/or other enhancements. System 10 may implement a graph having nodes used in the performance of calculations, and edges representing relationships between the nodes. The graph may be directed, acyclic, and/or have other properties. The nodes in the graph may be updateable, retrievable, and/or have other properties or features that enhance operation of system 10. In some implementations, system 10 may include one or more of electronic storage 12, one or more processors 14, external resources 16, one or more client computing platforms 18, and/or other components.

The various components of system 10 may be configured for electronic communication therebetween. Such communication may be accomplished via one or more networks, one or more direct connections, one or more wireless connections, one or more wired connections, and/or other electronic communication media. One or more of the components of system 10 may be implemented in a server (not shown). The server may be in communication with client computing platforms 18 via a client/server architecture to provide access to users of system 10 via client computing platforms 18.

Electronic storage 12 stores the nodes of the graph. The nodes are used in the performance of calculations, and include calculation objects. A calculation object may include one or more of a program, a reference to an external resource, a library, and/or other information to be used and/or to record the result of a calculation. A program may refer to a set of information configured to cause one or more processors to execute commands or instructions specified by the set of information. A program may be compiled (or may require compiling), and/or may be uncompiled (e.g., a script and/or other uncompiled programs). A program may include one or more of source code, object code, machine code, and/or other types of code. Data may include information generated by a previous calculation (e.g., a result of a calculation and/or other information), information dictated by a market or controlling body (e.g., an interest rate), a statistic, and/or other information. Data may reflect real world variable at a specific time, and/or may reflect speculation about what a real world variable was, is, and/or will be at some time. A reference to an external resource may specify a location (e.g., a network location or address) at which the external resource can be accessed. The reference may cause a query to be generated for the external resource. The external resource may include one or more of a program, data, a library, and/or other resources. A library may include a collection of implementations of behavior, may be written in terms of a language, may have a well-defined interface by which the behavior is invoked, and/or may have other properties. Libraries may differ from programs in that a library may be organized in such a way that it can be used by multiple programs which may have no connection to each other, while code that is part of a program is organized to only be used within that one program.

Nodes in the graph are identified by keys. A key of a node may include one or more of a node identifier, one or more parameters, a set of parameter values, a contextual label collection, and/or other information. The contextual label collection includes one or more contextual labels that are specified for the node at the time that the node is created. The contextual labels correspond to contexts in which sets of nodes exist. The contextual labels in the contextual label collection may be ordered within the contextual label collection in a manner that dictates how the node is used to satisfy future queries.

Figure 2:
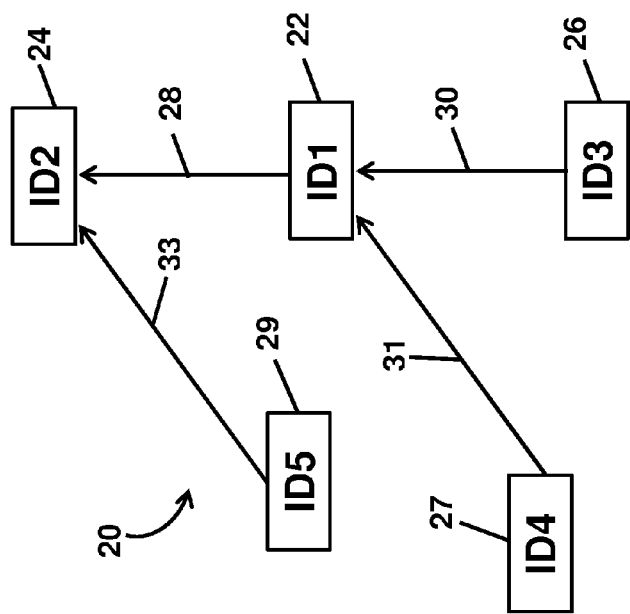
FIG. 2 illustrates a graph of nodes for implementation in quantitative analysis.

The edges in the graph represent dependencies between the nodes. The dependencies indicate specific nodes used in the creation of other nodes. By way of non-limiting example, FIG. 2 illustrates a graph 20. Graph 20 includes a first node 22, a second node 24, a third node 26, a fourth node 27, a fifth node 29, and/or other nodes (not shown in FIG. 2). First node 22 is identified by a first key that includes a first node identifier (ID1). Second node 24 is identified by a second key that includes a second node identifier (ID2). Third node 26 is identified by a third key that includes a third node identifier (ID3). Fourth node 27 is identified by a fourth key that includes a fourth node identifier (ID4). Fifth node 29 is identified by a fifth key that includes a fifth node identifier (ID5). In graph 20, a first edge 28 between first node 22 and second node 24 represents that first node 22 was used in the creation of second node 24, making first node 22 a dependency of second node 24. A second edge 30 between third node 26 and first node 22 represents that third node 26 was used in the creation of first node 22, making third node 26 a dependency of first node 22. A third edge 31 between fourth node 27 and first node 22 represents that fourth node 27 was used in the creation of first node 22, making fourth node 27 a dependency of first node 22. Since second node 24 has a dependency on first node 22, and first node 22 has a dependency on third node 26 and a dependency on fourth node 27, second node 24 has a "transitive dependency" on third node 26 (or third node 26 is a transitive dependency of first node 22), and second node 24 has a transitive dependency on fourth node 27. Fifth node 29 is also a dependency of second node 24, as denoted by a fourth edge 33.

Although the first node identifier, the second node identifier, the third node identifier, the fourth node identifier, and the fifth node identifier are represented as having wholly different values in FIG. 2, this is not intended to be limiting. Two or more of nodes 22, 24, 26, 27, and/or 29 shown in FIG. 2 may have node identifiers with the same value, or such that one of the node identifiers is a variant of one of the other node identifiers. For example, if third node 26 includes a program, and first node 22 includes a result of a calculation performed by the program, the third node identifier and the first node identifier may be the same, or may be variants of each other that indicate one node includes a program and/or the other node includes a result of a calculation.

Queries to the graph can be satisfied using nodes including results of previous calculations by the programs in other nodes, rather than re-executing the programs. This re-use of results may reduce duplicative use of processing resources, communication resources, and/or other resources. The storage of dependencies and transitive dependencies between the nodes creates a record that reflects not only the relationships between nodes including programs and nodes including results of the programs, but also indicates for a given node, which includes a result of a calculation, all (or substantially all) of the specific calculation objects (e.g., programs, data, libraries, etc.) used in the calculation of the result in the given node. This memoization and record-keeping not only reduces duplicative use of resources, but also facilitates auditing of individual results by analysis of dependencies and transitive dependencies.

Referring back to FIG. 1, electronic storage 12 comprises non-transitory electronic storage media that electronically stores information. Electronic storage 12 may include one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 12 may include virtual storage resources, such as storage resources provided via a cloud and/or a virtual private network. Electronic storage 12 may store software algorithms, information determined by processor 14, information received via client computing platforms 18, and/or other information that enables system 10 to function properly. Electronic storage 12 may be a separate component within system 10, or electronic storage 12 may be provided integrally with one or more other components of system 12 (e.g., processor 14).

Processor 14 is configured to provide information processing capabilities within system 10. Processor 14 is configured to execute one or more of a user interface module 32, a node search module 34, a program execution module 36, a node addition module 38, and/or other modules.

User interface module 32 is configured to define a user interface for presentation to users of system 10. The user interface provides access to system 10 for the users. The user interface may include a graphical user interface and/or other user interfaces presented to the users via client computing platforms 18. The definitions of the user interfaces may be communicated to client computing platforms 18 from processor 14. The user interface is configured to receive entry and/or selection of queries to system 10. The queries may include one or more of queries for results of calculations performed by nodes, updates to nodes, and/or other queries. The user interface is configured to present results of queries. The results may include results of calculation provided by nodes, and/or other results.

A query may include specified information that facilitates identification of a node that corresponds to the query. Specified information may include information found in the keys of the nodes. For example, specified information may include one or more of a node identifier, one or more parameters, one or more parameter values, a specified contextual label collection, and/or other information. Specified information may be used to identify the node(s) that satisfy a query.

Node search module 34 is configured to identify nodes that satisfy queries based on keys identifying the nodes, the values of the nodes, and/or other information. The values of the nodes may include one or more of dependencies of the nodes (and/or keys of the dependencies), transitive dependencies of the nodes (and/or keys of the transitive dependencies), information included in the nodes, and/or other values of the nodes. For example, referring back to graph 20 in FIG. 2, identification of second node 24 as satisfying a first query may be based on the second key and further based on the first key and the fifth key by virtue of the dependency of second node 24 on first node 22 and fifth node 29. Such identification of second node 24 as satisfying the first query may still further be based on the third key and the fourth key by virtue of the transitive dependency of second node 24 on third node 26 and fourth node 27.

Returning to FIG. 1, node search module 34 may be configured to identify nodes that satisfy queries to the graph based on the collections of contextual labels included in the keys. This may include performing searches for nodes having collections of contextual labels that correspond to a specified collection of contextual labels in a query in the process of identifying a node that satisfies the query. A contextual label collection that corresponds to the specified collection of contextual labels may be the same as the specified contextual label collection, or may be the same as a modified version of the specified contextual label collections if no suitable nodes include the full specified contextual label collection. The specified contextual label collection may be modified to determine the modified version of the specified contextual label collection in a pre-determined and/or iterative manner, as is discussed herein. The implementation of the contextual label collections may facilitate substitution of various calculation objects in determining results of calculations without permanently modifying nodes including the calculation objects that are being substituted, and/or without requiring duplication of nodes including calculation objects that are not being substituted. This may enhance customizability, experimentation, trouble-shooting, recreation of previous calculations, and/or provide other enhancements. Further description of the manner in which node search module 34 may search for a node having a contextual label collection that corresponds to a specified contextual label collection in a query is provided with respect to the description of FIG. 5, which appears below.

Figure 3:
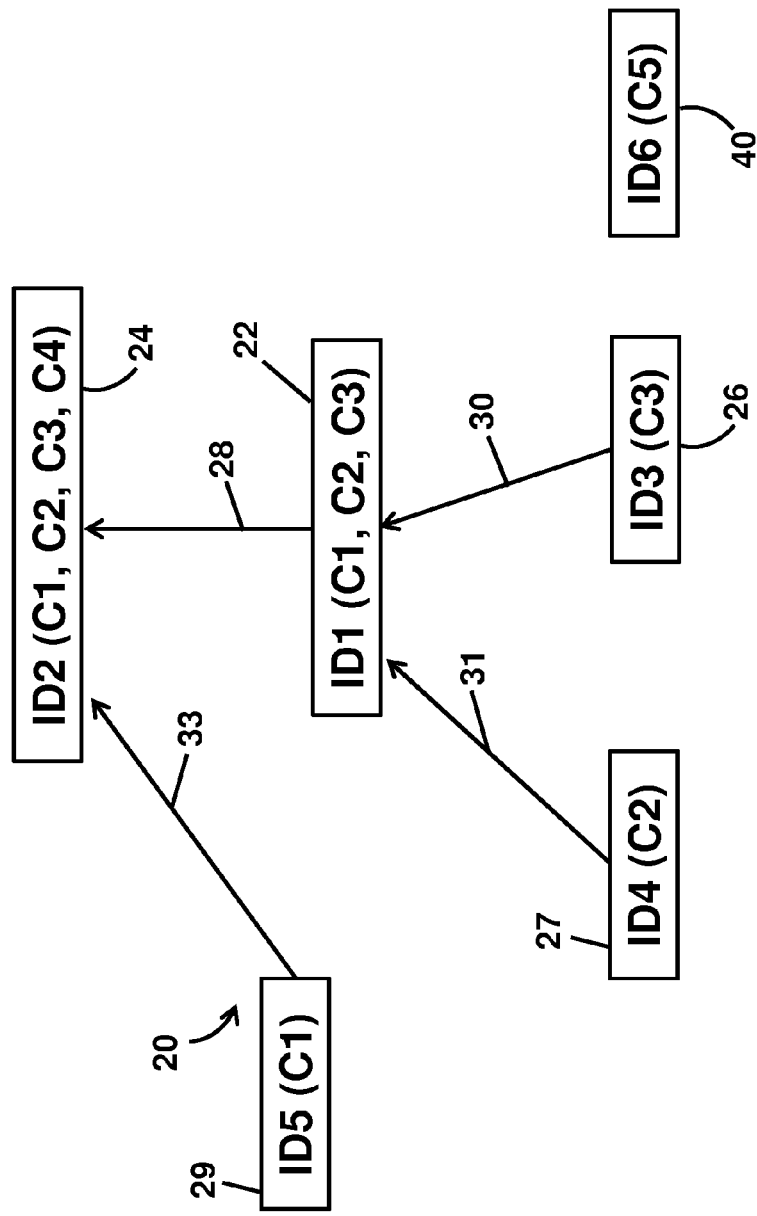
FIG. 3 illustrates a graph of nodes for implementation in quantitative analysis.

By way of illustration, FIG. 3 depicts graph 20, in which the first key includes a first contextual label collection (C1, C2, C3), the second key includes a second contextual label collection (C1, C2, C3, C4), the third key includes a third contextual label collection (C3), the fourth key includes a fourth contextual label collection (C2), and the fifth key includes a fifth contextual label collection (C1). Graph 20 is further depicted as including a sixth node 40. Sixth node 40 is identified by a sixth key that includes a sixth node identifier (ID6) and a sixth contextual label collection (C5). The sixth node identifier may be the same as the fourth node identifier. By way of non-limiting example, in graph 20, if the first query includes a specified contextual label collection of (C1, C2, C3, C4, C5), identification of second node 24 as satisfying the first query is based on the second contextual label collection corresponding to the specified contextual label collection in the first query. Identification of second node 24 as satisfying the first query may be based on the fifth contextual label collection by virtue of the dependency of second node 24 on fifth node 29, based on the first contextual label collection by virtue of the dependency of second node 24 on first node 22, based on the third contextual label collection by virtue of the transitive dependency of second node 24 on third node 26, and/or based on the fourth contextual label collection by virtue of the transitive dependency of second node 24 on fourth node 27.

Returning to FIG. 1, node search module 34 may be configured such that upon receipt of a query for results of a computation, a search is first performed for a node including the result requested by the query. Responsive to there being no node including a result that satisfies the query, a search may be performed for a node including a program configured to effectuate performance of the computation to produce the result requested by the query. In some implementations, nodes including results of computations previously performed may be identified by keys that include node identifiers that are variants of node identifiers of nodes that include the programs that produced the results of the computations. In such implementations, node search module 34 may be configured to first perform search for a node having a node identifier that matches the specified node identifier from the query, and then to search a variant of the specified node identifier for a node including a program that would produce a result having the specified node identifier.

By way of illustration, returning to FIG. 3, assuming third node 26 includes a program and that first node 22 includes a result of a computation performed by the program of third node 26, the third node identifier may be a variant of the first node identifier. For example, a second query to graph 20 may be looking for a result of a calculation performed by the program included in third node 26 that uses a calculation object included in sixth node 40, rather than the calculation object included in fourth node 27, during execution of the program. To specify this, the second query may include a specified node identifier that corresponds to the first node identifier, and a specified contextual label collection of the second query that corresponds to the sixth contextual label collection and the third contextual label collection. Such a specified contextual label collection may include, for example, (C3, C5). In response to the second query, it may be determined that none of the nodes in graph 20 satisfies the second query. Then, the second query may be modified and graph 20 may be re-searched for the modified query. The modified query may be configured to request a node having the program that will generate the result requested in the second query. This may include modifying the specified node identifier to the variant of the specified node identifier that matches the third node identifier. The modified query may be satisfied by third node 26. However, since third node 26 includes a program, and not a result of a previous computation, the program may need to be executed to satisfy the second query, with the generated result providing the result that would satisfy the second query (e.g., using the calculation object in sixth node 40 instead of the calculation object in fourth node 27).

Returning to FIG. 1, program execution module 36 is configured to effectuate execution of programs included in nodes. This may include actually executing the programs, requesting or managing execution of the programs on a distributed computing system (e.g., a computing grid, and/or other distributed systems), and/or effectuating execution in other ways. Program execution module 36 may effectuate execution of a program included in a node responsive to the node being identified by node search module 34 as including a program configured to effectuate computation of a result requested by a query. The execution of such a program would generate output from the node including the program that includes the result requested by the query. Program execution module 36 is further configured such that the output from the node including the program further includes the dependencies of the result generated by the program, including a dependency on the node generating the output, and any other nodes on which the execution of the program relied.

Node addition module 38 is configured to add nodes to the graph. This includes adding nodes to the graph including results generated by the programs in the nodes. For example, responsive to node search module 34 identifying a node including a program as satisfying a query, and further responsive to program execution module 36 executing the program and producing output from the identified node (including the result requested by the query), node addition module 38 adds a node to the graph that includes the output from the identified node. The newly added node includes the result requested by the query. Node addition module 38 may also store the dependencies of the newly added node (which are the dependencies indicated in the output of the identified node), and/or other information. The key of the newly added node is determined by node addition module 38 based on one or more of information specified in the query, information included in the key of the node identified by node search module 34, and/or information included in the keys of dependencies indicated in the results of the identified node (which are now the dependencies of the newly added node). For example, a node identifier in the key of the newly added node may match the specified node identifier in the unmodified second query. A contextual label collection of the newly added node may be determined based on the specified contextual label collection in the second query (e.g., they may match). Other components of the key of the newly added node may correspond to information specified in the second query and/or keys of its dependencies. These components may include, for example, parameters, parameter values, and/or other components.

Figure 4:
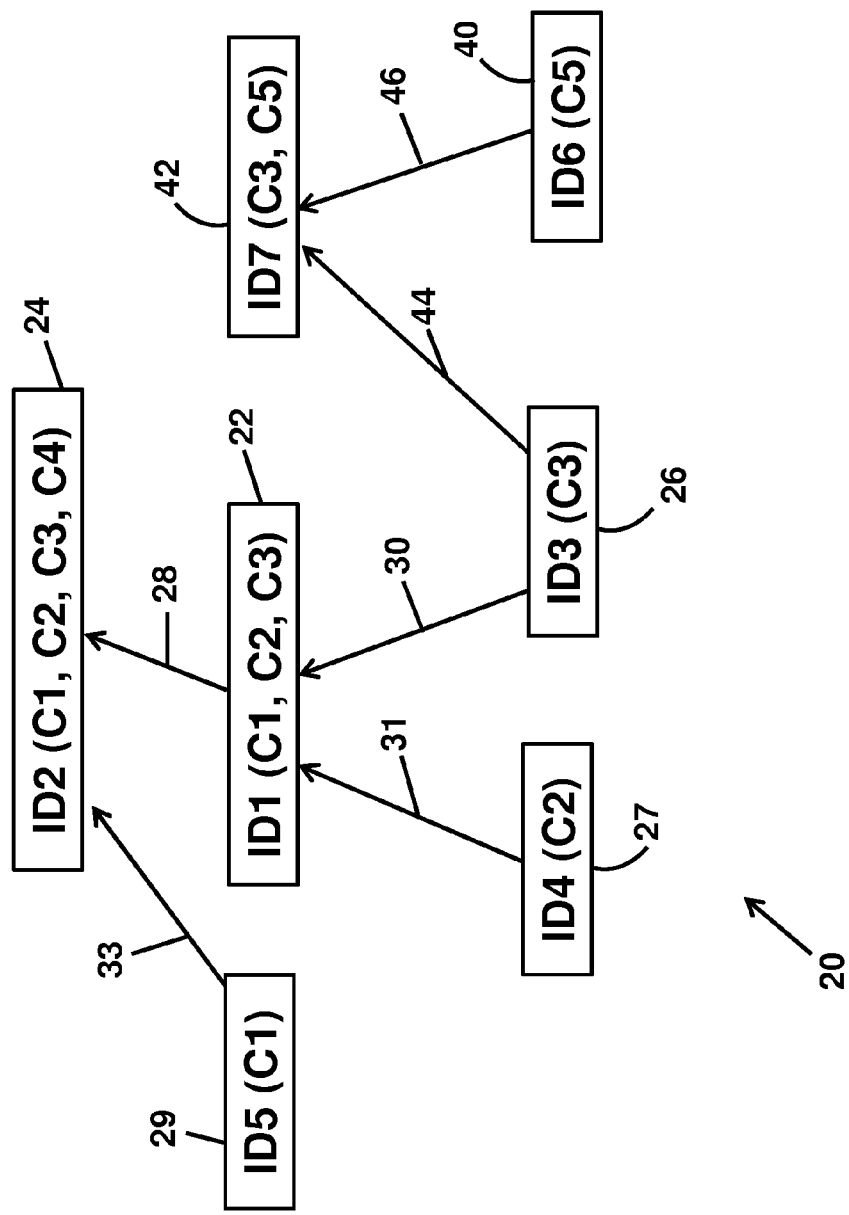
FIG. 4 illustrates a graph of nodes for implementation in quantitative analysis

By way of illustration, FIG. 4 depicts graph 20 subsequent to the second query which was satisfied by third node 26 and caused the program included in third node 26 to be executed using the calculation object in sixth node 40. The execution of the program in third node 26 generates an output from third node 26 that is added to graph 20 as a seventh node 42. Seventh node 42 includes the result of the execution of the program. Seventh node 42 is identified by a seventh key. The seventh key includes a seventh node identifier (ID7), a seventh contextual label collection (C3, C5), and/or other information. The seventh node identifier may be the same as the first node identifier and/or may be based on the third node identifier by virtue of seventh node 42 including a result of the program included in third node 26 (e.g., the third node identifier may be a variant of the fifth node identifier). A fifth edge 44 in graph 20 represents the dependency of seventh node 42 on third node 26. The seventh contextual label collection may be determined based on the specified contextual label collection. For example, the seventh contextual label collection may match the specified contextual label collection.

As discussed herein, in some cases, a program, when executed, generates a further query to graph 20. Such queries may request, for example, data, a result of a previous computation, a library (and/or functionality associated therewith), and/or other calculation objects. For example, in FIG. 4, execution of the program included in third node 26 generated a further query that was satisfied by sixth node 40. By virtue of the further query satisfied by sixth node 40, and the reliance of the program in third node 26 on the calculation object in sixth node 40, seventh node 42 has a dependency on sixth node 40, which is stored and is reflected in graph 20 as a sixth edge 46.

Returning to FIG. 1, processor 14 may include one or more of a digital processor, an analog processor, a digital circuit designed to process information, an analog circuit designed to process information, a state machine, and/or other mechanisms for electronically processing information. Although processor 14 is shown in FIG. 1 as a single entity, this is for illustrative purposes only. In some implementations, processor 14 may include a plurality of processing units. These processing units may be physically located within the same device, or processor 14 may represent processing functionality of a plurality of devices operating in coordination.

It should be appreciated that although modules 32, 34, 36, and 38 are illustrated in FIG. 1 as being co-located within a single processing unit, in implementations in which processor 14 includes multiple processing units, one or more of modules 32, 34, 36, and/or 38 may be located remotely from the other modules. The description of the functionality provided by the different modules 32, 34, 36, and/or 38 described below is for illustrative purposes, and is not intended to be limiting, as any of modules 32, 34, 36, and/or 38 may provide more or less functionality than is described. For example, one or more of modules 32, 34, 36, and/or 38 may be eliminated, and some or all of its functionality may be provided by other ones of modules 32, 34, 36, and/or 38. As another example, processor 14 may be configured to execute one or more additional modules that may perform some or all of the functionality attributed below to one of modules 32, 34, 36, and/or 38.

External resources 16 include resources that are external, physically and/or logically, from the other components of system 10. This may include resources controlled and/or operated by an entity separate and/or discrete from an entity operating and/or using the rest of system 10. However, this is not intended to be limiting, as the same entity may be operating and/or using both one or more of the external resources 16 and/or the one or more of the other ones of the components of system 10. By way of non-limiting example, external resources 16 may include one or more of an analytics library, an information source, and/or other resources.

Client computing platforms 18 are configured to provide access to system 10 for users. Client computing platforms 18 individually include electronic processing, storage, and/or communication resources to provide such access. Client computing platforms 18 are associated with user interfaces devices that facilitate presentation to and reception of information to and from the users. By way of non-limiting example, client computing platforms 18 may include one or more of a desktop computer, a laptop computer, a tablet, a smartphone, a handheld computer, a personal digital assistant, and/or other computing platforms.

Figure 5:
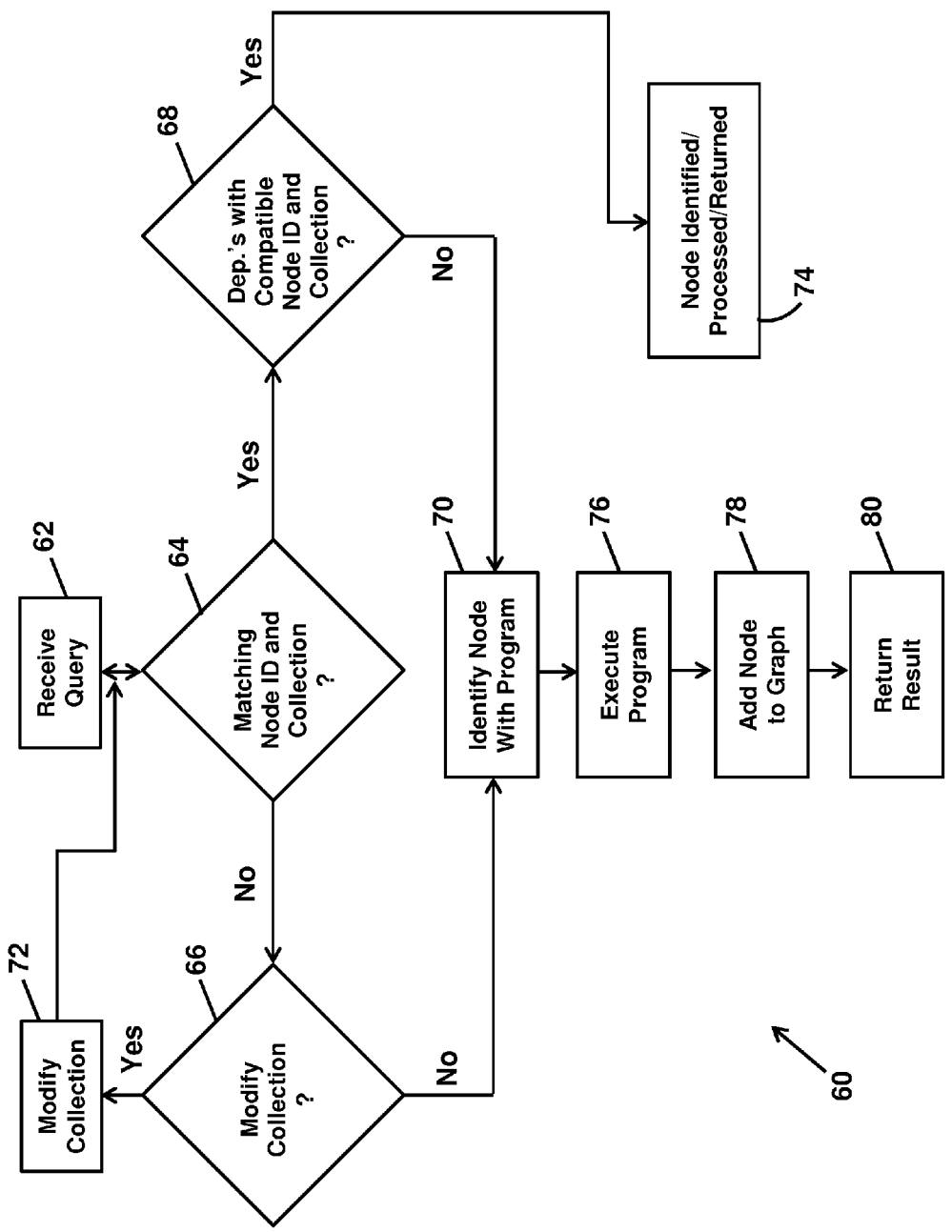
FIG. 5 illustrates a method of performing quantitative analysis.

By way of illustration, FIG. 5 depicts a method 60 of satisfying a query to a graph. The implementation of contextual labels associated with nodes in the graph to identify a node that satisfies the query may provide for various enhancements. These may include an ability to recreate previous analysis (in part or in total), to view analyze different points in time with different techniques, to update data and/or calculations previously made, and/or other enhancements. The operations of method 60 presented below are intended to be illustrative. In some embodiments, method 60 may be accomplished with one or more additional operations not described, and/or without one or more of the operations discussed. Additionally, the order in which the operations of method 60 are illustrated in FIG. 5 and described below is not intended to be limiting.

At an operation 62, a query is obtained. The query may be generated based on a user request, by execution of a program, and/or generated in other ways. The query may include specified information. The specified information may include one or more of a specified node identifier, one or more specified parameters, one or more specified parameter values, a specified contextual label collection, and/or other specified information. Operation 62 may be performed by a node search module the same as or similar to node search module 34 (shown in FIG. 1 and described herein).

At an operation 64, a determination is made as to whether there exists a node identified by a key having components that match certain components of the specified information. For example, the certain components may include one or more of a node identifier, a contextual label collection, and/or other components that match the specified information. Responsive to no node being identified by a key that includes the certain components (e.g., a node identifier and a contextual label collection) that match the specified information, method 60 proceeds to an operation 66. Responsive to identification of a node identified by a key including the certain components (e.g., a node identifier and contextual label collection) that match the specified information, method 60 proceeds to an operation 68. In some implementations, operation 64 may be performed by a node search module the same as or similar to node search module 34 (shown in FIG. 1 and described herein).

At operation 66, a determination is made as to whether the specified contextual label collection should be modified in preparation for another search. This determination may be based on the contextual labels and/or the number of contextual labels in the specified contextual label collection. Responsive to a determination at operation 66 that the specified contextual label collection should not be modified (e.g., if there are no modifications or further modifications to be made), method 60 proceeds to an operation 70. Responsive to a determination at operation 66 that the specified contextual label collection should be modified, method 60 proceeds to an operation 72. In some implementations, operation 66 may be performed by a node search module the same as or similar to node search module 34 (shown in FIG. 1 and described herein).

At operation 72, the specified contextual label collection is modified, and then method 60 returns to operation 64 for a search on the modified specified contextual label collection. The modification may be performed in a deterministic manner. This may mean that the modification(s) performed on the specified contextual label collection are performed in accordance with a predetermined order or routine as method 60 iterates through operations 64, 66, and 72 until a matching node is identified at operation 64, or until there are no further modifications to be performed (e.g., as determined at operation 66). The modifications to the specified contextual label collection may be performed in the following order as method 60 iterates through operations 64, 66, and 72: (i) the specified contextual label collection is modified to include only a last contextual label in the specified set of contextual labels, (ii) the specified contextual label collection is reduced to an abbreviated contextual label collection from which the last contextual label has been removed, (iii) the abbreviated contextual label collection is modified to include only a last contextual label in the abbreviated set of contextual labels, and (iv) modifications (ii) and (iii) are iterated over until there are no further modifications to be made (e.g., the contextual label collection can no longer be further abbreviated).

By way of example, for a specified contextual label collection of (C1, C2, C3, C4), successive iterations through operation 72 may results in successive queries at operation 64, assuming no matching node was found for any of the successive queries, that search for the following contextual label collections: (C1, C2, C3, C4) (this may be the initial search at operation 64); (C4); (C1, C2, C3); (C3); (C1, C2); (C2); and (C1). After a search for the last contextual label collection (C1), it may be determined at operation 66 that no further modifications are to be made, and method 60 would proceed to operation 70. In some implementations, operation 72 may be performed by a node search module the same as or similar to node search module 34 (shown in FIG. 1 and described herein).

At operation 68, a determination is made as to whether the node identified at operation 64 has dependencies on nodes with keys that include contextual label collections that are compatible with the specified contextual label collection in the query. If the node identified at operation 64 has a dependency, or a transitive dependency, to another node including a contextual label collection that is not compatible with a specified contextual label collection, then the node identified at operation 64 does not satisfy the query, and method 60 proceeds to operation 70. If the node identified at operation 64 does not have any dependency, or transitive dependency, with a contextual label collection that is not compatible with the specified contextual label collection, then method 60 proceeds to an operation 74. The determination performed at operation 68 includes checking to make sure that the node identified at operation 64 does not rely (e.g., through a dependency or transitive dependency) on another node that is not compatible contextually with the query. In some implementations, operation 68 may be performed by a node search module the same as or similar to node search module 34 (shown in FIG. 1 and described herein).

In some implementations, operation 68 includes, for a given node on which the node identified at operation 64 has a dependency or transitive dependency, performing a search of nodes to ensure that there is no node having a key with components that correspond to components of the key of the given node, but also has a contextual label collection that corresponds more closely to the specified contextual label collection in the query. A first contextual label collection may be said to correspond more closely to a specified contextual label collection than a second contextual label collection if the first contextual label collection would be derived from the specified contextual label collection through the iterative modifications made at operation 72 before the second contextual label collection would be derived. For instance, with respect to the exemplary specified contextual label collection (C1, C2, C3, C4), a contextual label collection (C3) would correspond more closely to the specified contextual label collection than a contextual label collection (C1, C2). The presence of a given node having a key with components that match the components of a dependency node, but with a contextual label collection that corresponds more closely to the specified contextual label collection indicates that the calculation object in the given node should be used to satisfy the query with the specified contextual label collection, and not the dependency node. As such, any result included in a node having a dependency to the dependency node will need to be recalculated using the calculation object of the given node.

At operation 74, the node identified at operation 64 is further processed and/or returned as satisfying the query received at operation 62. This may include performing further examination of the identified node and/or the graph to ensure compatibility with the original query, using the calculation object in the identified node in a subsequent calculation, presenting the calculation object in the identified node as a result satisfying the query, and/or other actions.

At operation 70, a node is identified that includes a program which will generate the result requested by the query. This identification may include modifying the query to search for nodes that include programs, and/or other operations. Responsive to no node being found that satisfies the modified query, an error message may be generated. In some implementations, operation 70 may be performed by a node search module the same as or similar to node search module 34 (shown in FIG. 1 and described herein).

At an operation 76, the program in the node identified at operation 70 is executed. Execution of the program may generate one or more additional queries to the graph. The information specified in the queries may be determined based on the specified information from the query obtained at operation 62, the values of the node including the program being executed, and/or other sources. The execution of the program generates output from the node. The output includes the result of the program, a record of the dependencies of the result produced by the program, and/or other information. The dependencies of the result produced by the program include one or more of nodes with calculation objects relied on by the program in producing the result, the node including the program that produced the result, and/or other dependencies. In some implementations, operation 76 may be performed by a program execution module the same as or similar to program execution module 36 (shown in FIG. 1 and described herein).

At an operation 78, a node is added to the graph that includes the result of the program executed at operation 76. Adding the node to the graph includes determining a key of the node, storing the node, storing the dependencies of the node (e.g., as indicated in the output of operation 76), and/or other operations. In some implementations, operation 78 is performed by a node addition module the same as or similar to node addition module 38 (shown in FIG. 1 and described herein).

At an operation 80, the result of the calculation performed by the program executed at operation 76 is returned as a response to the query.

Figure 6:
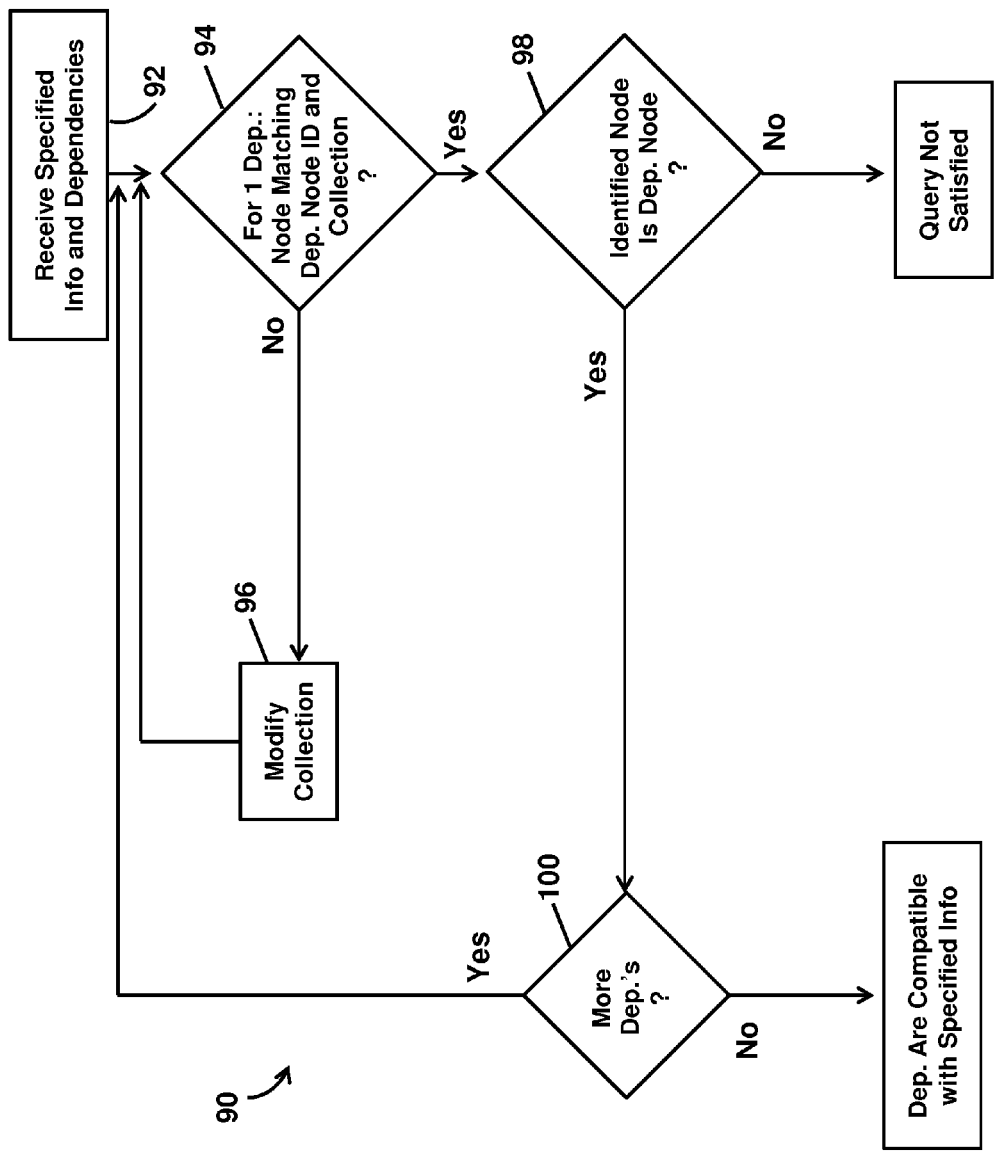
FIG. 6 illustrates a method of checking to confirm that dependency nodes of a node identified in a query to a graph are compatible with the query

FIG. 6 depicts a method 90 of checking to confirm that dependency nodes of a node identified in a query to a graph are compatible with the query. In some implementations, method 90 may be used in operation 68 of method 60 (shown in FIG. 5 and described herein). However, this is not intended to be limiting, as method 90 may be used in a variety of contexts. The operations of method 90 presented below are intended to be illustrative. In some embodiments, method 90 may be accomplished with one or more additional operations not described, and/or without one or more of the operations discussed. Additionally, the order in which the operations of method 90 are illustrated in FIG. 6 and described below is not intended to be limiting.

At an operation 92, specified information from a query, and dependency information associated with a node identified as potentially satisfying the query are received. The specified information may include, for example, a specified contextual label collection and/or other specified information from the query. The dependency information may indicate and/or provide access to dependencies of the identified node. The dependency information may indicate and/or provide access to a full set of transitive dependencies for the identified node. For example, the dependency information may specify dependencies of the identified node, dependencies of the dependencies may be obtained based on this information (e.g., by accessing dependencies of the nodes on which the identified node depends), and so on.

At an operation 94, a search of the graph may be performed for a node having the full specified contextual label collection and a node identifier that matches a node identifier of a first dependency node to which the identified node has a dependency or transitive dependency. If no such node exists, method 90 proceeds to an operation 96.

At operation 96, the specified contextual label collection is modified. The modification performed at operation 96 may be the same as or similar to the modification to contextual label collection performed at operation 72 (shown in FIG. 5 and described herein). The modified contextual label collection is then used in operation 94 to re-search the graph for any node having a node identifier that matches the node identifier of the first dependency node, and having a contextual label collection that matches the modified contextual label collection. Operations 94 and 96 are iterated in this way until a node is identified at operation 94 as having a node identifier that matches the node identifier of the first dependency node, and having a contextual label collection matching the contextual label currently being searched (e.g., the specified contextual label collection or the contextual label collection as modified at operation 96 one or more times). Upon identification of a node at operation 94, method 90 proceeds to an operation 98.

At operation 98, a determination is made as to whether the node identified at operation 94 is the first dependency node. If the node identified at operation 94 is not the first dependency node, then there is a node having the same node identifier as the first dependency node and a contextual label collection that corresponds more closely to the specified contextual label collection than the contextual label collection of the first dependency node. As such, the node that was previously identified as potentially satisfying the original query does not actually satisfy the query. If the node identified at operation 94 is the first dependency node, then method 90 proceeds to an operation 100.

At operation 100, a determination is made as to whether there are any further nodes on which the node identified as potentially satisfying the query has a dependency or transitive dependency. Responsive to there being a further dependency, for example to a second dependency node, method 90 returns to operation 94 and iterates over operations 94, 96, and/or 98 for the further dependent node. Response to a determination at operation 100 that there are not further dependencies to assess, the node identified as potentially satisfying the query is confirmed as having dependencies with contextual label collections that are compatible with the specified contextual label collection in the original query.

Figure 7:
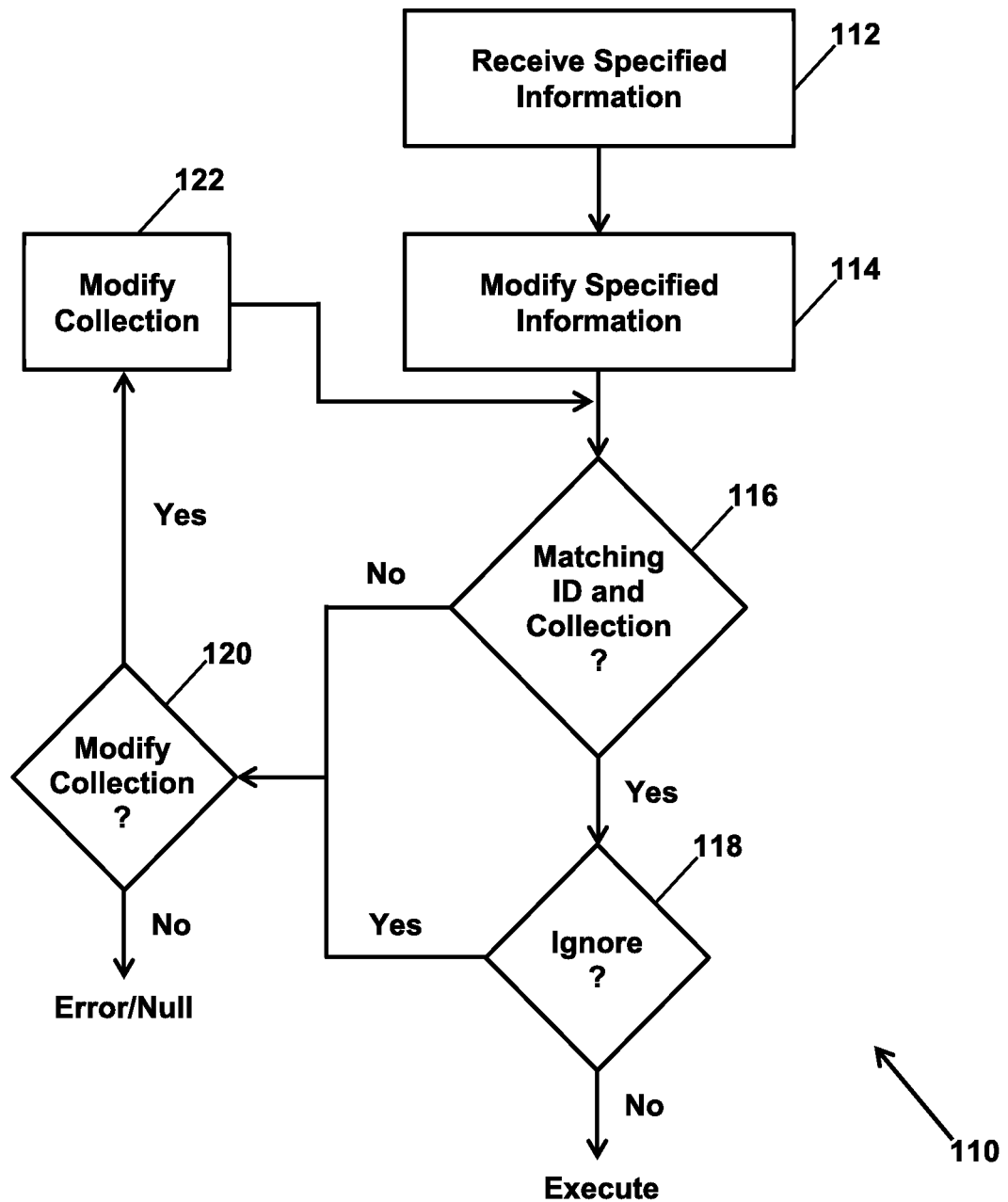
FIG. 7 illustrates a method of discovering and executing a program in a node satisfying a query.

FIG. 7 depicts a method 110 of discovering and executing a program in a node satisfying the query. In some implementations, method 110 may be used in operation 70 of method 60 (shown in FIG. 5 and described herein). However, this is not intended to be limiting, as method 110 may be used in a variety of contexts. The operations of method 110 presented below are intended to be illustrative. In some embodiments, method 110 may be accomplished with one or more additional operations not described, and/or without one or more of the operations discussed. Additionally, the order in which the operations of method 110 are illustrated in FIG. 7 and described below is not intended to be limiting.

At an operation 112, specified information from a query is received. The specified information may include, for example, a specified node identifier, a specified contextual label collection and/or other specified information from the query.

At an operation 114, the specified information may be modified to search for a node that includes a calculation object that will produce a result requested by the query, rather than a node that includes the actual result. This modification may include one or more of modifying the node identifier, modifying parameters and/or parameter values included in the specified information, and/or other modifications.

At an operation 116, a determination is made as to whether there exists a node identified by a key having components that match certain components of the specified information, as modified at operation 114. For example, the certain components may include one or more of a node identifier, a contextual label collection, and/or other components that match the specified information as modified at operation 114. Responsive to no node being identified by a key that includes the certain components of the specified information (e.g., a node identifier and a contextual label collection that match the specified information (as modified)), method 110 proceeds to an operation 120. Responsive to identification of a node identified by a key that includes the certain components of the specified information (e.g., a node identifier and contextual label collection that match the specified information (as modified)), method 110 proceeds to an operation 118.

At operation 118, a determination is made as to whether the node identified at operation 116 should be ignored by the search. This determination is made based on a filter associated with the program included in the identified node. The filter may specify whether the program included in the identified node should be executed when queried with the rest of the specified information. For example, for a given contextual label (or contextual label collection), a given parameter (or collection of parameters), a given parameter value (or collection of parameter values), other specified information, or combination of the foregoing, the filter may specify that the program included in the identified node should be ignored. By way of example, a program that adjusts the price of all of the stocks in a particular sector (e.g., technology) may be associated with a filter that causes stocks outside of the particular sector (e.g., non-technology stocks) to be ignored. Responsive to a determination that the node identified at operation 116 should not be ignored, the calculation object in the node may be provided for execution. Responsive to a determination that the node identified at operation 116 should be ignored, method 110 proceeds to operation 120.

At operation 120, a determination is made as to whether the specified contextual label collection should be modified in preparation for another search. This determination may be based on the contextual labels and/or the number of contextual labels in the specified contextual label collection. Responsive to a determination at operation 120 that the specified contextual label collection should be modified, method 110 proceeds to an operation 122. Responsive to a determination at operation 120 that the specified contextual label collection should not be modified (e.g., if there are no modifications or further modifications to be made), there may not be a node that satisfies the query. This may result in an error message, or some other communication with the user that the query has not been satisfied.

At operation 122, the specified contextual label collection is modified. The modification performed at operation 122 may be the same as or similar to the modification to contextual label collection performed at operation 72 (shown in FIG. 5 and described herein). The modified contextual label collection is then used in operation 116 to re-search the graph for any node having a node identifier that matches the specified node identifier (or the modified node identifier), and having a contextual label collection that matches the modified contextual label collection. Operations 116, 120, and 122 are iterated in this way until a node is identified at operation 116 as having a matching node identifier, and having a contextual label collection matching the contextual label currently being searched (e.g., the specified contextual label collection or the contextual label collection as modified at operation 122 one or more times), and that is not ignored at operation 118.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to facilitate performance of quantitative analysis, the system comprising:
    a computer system comprising one or more processors programmed to execute one or more computer program instructions which, when executed, cause the computer system to:
        store, in non-transitory storage media, a graph comprising nodes used in the performance of calculations, wherein the graph nodes comprise at least one node representing a calculation object, wherein the graph nodes are identified by keys that comprise node identifiers and contextual label collections;
        obtain a result calculated using a first calculation object represented by a first node of the graph nodes, wherein the first node is identified by a first key that comprises a first node identifier and a first contextual label collection;
        generate a second key for identifying a second node that represents the obtained result such that the second key is generated to include a second node identifier and a second contextual label collection, wherein the second contextual label collection includes one or more contextual labels of the first contextual label collection based on the first calculation object being used to calculate the obtained result;
        assign the second key to the second node for identifying the second node; and
        store, in the non-transitory storage media, the second node as part of the graph.

2. The system of claim 1, wherein the first calculation object comprises a first previously-calculated result, and the first node represents the first previously-calculated result, and wherein the second key is generated such that the second contextual label collection includes one or more contextual labels of the first contextual label collection based on the first previously-calculated result being used to calculate the obtained result.

3. The system of claim 1, wherein the first calculation object comprises a first program, and the first node represents the first program, and wherein the second key is generated such that the second contextual label collection includes one or more contextual labels of the first contextual label collection based on the first program being used to calculate the obtained result.

4. The system of claim 1, wherein the first calculation object comprises a first library, and the first node represents the first library, and wherein the second key is generated such that the second contextual label collection includes one or more contextual labels of the first contextual label collection based on the first library being used to calculate the obtained result.

5. The system of claim 1, wherein the computer system is further caused to:
    obtain a query comprising a specified contextual label collection; and
    responsive to the query, effectuate a search of the graph for a node having a context label collection that matches the specified contextual label collection.

6. The system of claim 5, wherein the computer system is further caused to:
    responsive to the search failing to identify a node having a contextual label collection that matches the specified contextual label collection, modify the specified contextual label collection by removing one or more contextual labels from the specified contextual label collection; and
    effectuate another search of the graph for a node having a contextual label collection that matches the modified contextual label collection.

7. The system of claim 6, wherein the search is effectuated prior to the second key being generated for the second node, and wherein the computer system is further caused to:
    identify the first node based on the first contextual label collection of the first node matching the modified contextual label collection or a further modified version of the specified contextual label collection; and
    responsive to identifying the first node, cause the first calculation object represented by the first node to be used to calculate the result to satisfy the query.

8. The system of claim 6, wherein the search is effectuated subsequent to the second key being generated for the second node, and wherein the computer system is further caused to:
    identify the second node based on the second contextual label collection matching the modified contextual label collection or a further modified version of the specified contextual label collection; and
    responsive to identifying the second node, provide the obtained result represented by the second node as a response to the query.

9. The system of claim 5, wherein edges in the graph represent dependencies between the graph nodes, wherein a node of the graph depends from another node when the other node is used to create the dependent node, and wherein the search comprises a traversal of the graph based on the dependencies between the graph nodes.

10. The system of claim 9, wherein the computer system is further caused to:
    assign the first node as a dependency of the second node based on the first calculation object represented by the first node being used to calculate the obtained result.

11. The system of claim 1, wherein the computer system is further caused to:

obtain a query comprising a specified contextual label collection;

responsive to the query, effectuate a search of the graph for a node having a context label collection that matches the specified contextual label collection;

identify a third node based on a third contextual label collection of the third node matching the specified contextual label collection or a modified version of the specified contextual label collection, wherein the third node represents a program;

responsive to identifying the third node, cause the program represented by the third node to calculate a result that satisfies the query; and provide the result calculated by the program represented by the third node as a response to the query.

12. The system of claim 1, wherein the second key is generated to include the second contextual label collection such that the second context label collection includes all the contextual labels of the first contextual label collection based on the first calculation object being used to calculate the obtained result.

13. The system of claim 1, wherein the first calculation object comprises a first previously-calculated result, a first program, or a first library.

14. A computer-implemented method of facilitating performance of quantitative analysis, the method being implemented in a computer system that comprises one or more processors executing computer program instructions which, when executed, perform the method, the method comprising:

storing, by the computer system, a graph comprising nodes used in the performance of calculations, wherein the graph nodes comprise at least one node representing a calculation object, and wherein the graph nodes are identified by keys that comprise node identifiers and contextual label collections;

obtaining, by the computer system, a result calculated using a first calculation object represented by a first node of the graph nodes, wherein the first node is identified by a first key that comprises a first node identifier and a first contextual label collection;

generating, by the computer system, a second key for identifying a second node that represents the obtained result such that the second key is generated to include a second node identifier and a second contextual label collection, wherein the second contextual label collection includes one or more contextual labels of the first contextual label collection based on the first calculation object being used to calculate the obtained result;

assigning, by the computer system, the second key to the second node for identifying the second node; and storing, by the computer system, the second node as part of the graph.

15. The method of claim 14, wherein the first calculation object comprises a first previously-calculated result, and the first node represents the first previously-calculated result, and wherein the second key is generated such that the second contextual label collection includes one or more contextual labels of the first contextual label collection based on the first previously-calculated result being used to calculate the obtained result.

16. The method of claim 14, wherein the first calculation object comprises a first program, and the first node represents the first program, and wherein the second key is generated such that the second contextual label collection includes one or more contextual labels of the first contextual label collection based on the first program being used to calculate the obtained result.

17. The method of claim 14, wherein the first calculation object comprises a first library, and the first node represents the first library, and wherein the second key is generated such that the second contextual label collection includes one or more contextual labels of the first contextual label collection based on the first library being used to calculate the obtained result.

18. The method of claim 14, further comprising:

obtaining, by the computer system, a query comprising a specified contextual label collection; and responsive to the query, effectuating, by the computer system, a search of the graph for a node having a context label collection that matches the specified contextual label collection.

19. The method of claim 18, further comprising:

responsive to the search failing to identify a node having a contextual label collection that matches the specified contextual label collection, modifying, by the computer system, the specified contextual label collection by removing one or more contextual labels from the specified contextual label collection; and effectuating, by the computer system, another search of the graph for a node having a contextual label collection that matches the modified contextual label collection.

20. The method of claim 19, wherein the search is effectuated prior to the second key being generated for the second node, the method further comprising:

identifying, by the computer system, the first node based on the first contextual label collection of the first node matching the modified contextual label collection or a further modified version of the specified contextual label collection;

responsive to identifying the first node, causing, by the computer system, the first calculation object represented by the first node to be used to calculate the result to satisfy the query.

21. The method of claim 19, wherein the search is effectuated subsequent to the second key being generated for the second node, the method further comprising:

identifying, by the computer system, the second node based on the second contextual label collection matching the modified contextual label collection or a further modified version of the specified contextual label collection; and responsive to identifying the second node, providing, by the computer system, the obtained result represented by the second node as a response to the query.

22. The method of claim 18, wherein edges in the graph represent dependencies between the graph nodes, wherein a node of the graph depends from another node when the other node is used to create the dependent node, and wherein the search comprises a traversal of the graph based on the dependencies between the graph nodes.

23. The method of claim 22, further comprising:

assigning, by the computer system, the first node as a dependency of the second node based on the first calculation object represented by the first node being used to calculate the obtained result.

24. The method of claim 14, further comprising:

obtaining, by the computer system, a query comprising a specified contextual label collection;

responsive to the query, effectuating, by the computer system, a search of the graph for a node having a context label collection that matches the specified contextual label collection;

identifying, by the computer system, a third node based on a third contextual label collection of the third node matching the specified contextual label collection or a modified version of the specified contextual label collection, wherein the third node represents a program;

responsive to identifying the third node, causing, by the computer system, the program represented by the third node to calculate a result that satisfies the query; and providing, by the computer system, the result calculated by the program represented by the third node as a response to the query.

25. The method of claim 14, wherein the second key is generated to include the second contextual label collection such that the second context label collection includes all the contextual labels of the first contextual label collection based on the first calculation object being used to calculate the obtained result.

26. The method of claim 14, wherein the first calculation object comprises a first previously-calculated result, a first program, or a first library.

* * * * *